Feb. 16, 1937.  E. C. HORTON  2,071,310
WINDSHIELD CLEANER
Filed April 26, 1935
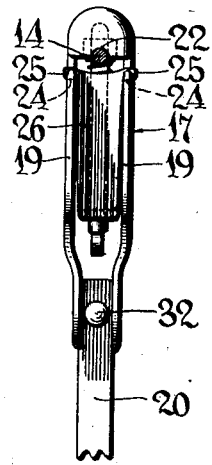
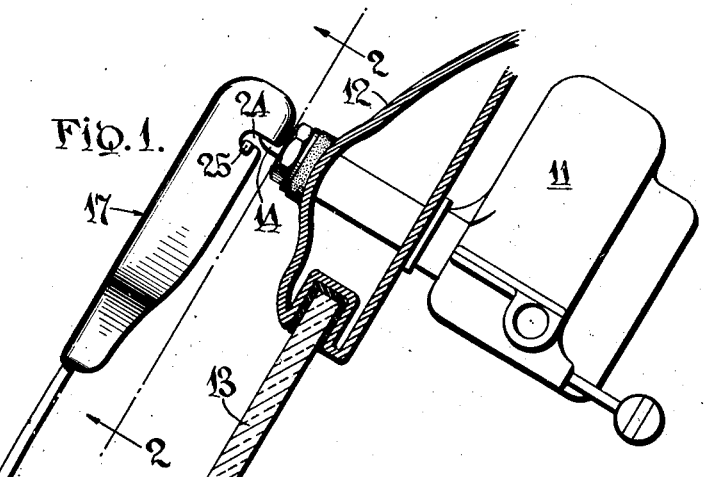
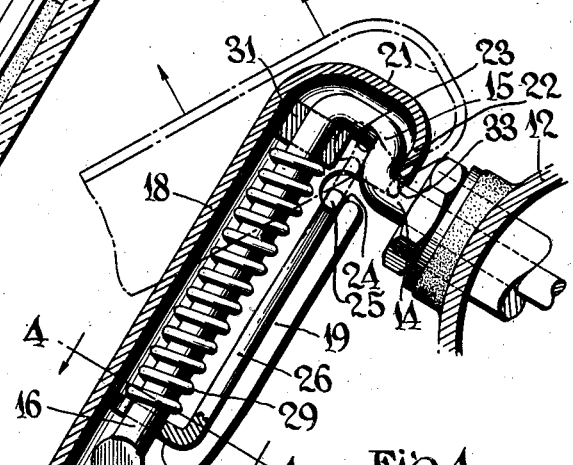
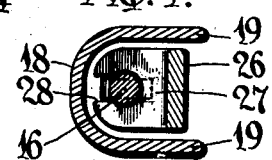
INVENTOR
*Erwin C. Horton*
BY
*Beau, Brooks, Buckley & Beau.*
ATTORNEYS Patented Feb. 16, 1937

2,071,310

UNITED STATES PATENT OFFICE 2,071,310

WINDSHIELD CLEANER

Erwin C. Horton, Hamburg, N. Y., assignor to Trico Products Corporation, Buffalo, N. Y.

Application April 26, 1935, Serial No. 18,478

6 Claims. (Cl. 15—255)

The present invention relates to windshield cleaners for automobiles and other vehicles, and has particular relation to means for mounting the wiper arms of such cleaners to the supporting or drive shafts thereof.

The invention contemplates a shaft particularly formed to act as a fulcrum for the arm assembly and as a carrier for spring means to urge the wiper arm toward the surface of the glass to be wiped, and to a casing for spring and associated parts adapted to serve as the pivot means and to connect the arm to the shaft in such manner that it may be readily detached and replaced without the use of special tools.

These and other objects and advantages will appear from the following description of one typical embodiment of the invention, reference being made to the accompanying drawing, wherein:

Fig. 1 is a side elevation of a windshield cleaner, embodying the present invention, mounted upon the windshield of a vehicle;

Fig. 2 is a rear view of the wiper arm mounting means, taken substantially along line 2—2 of Fig. 1;

Fig. 3 is a longitudinal sectional view of the mounting means; and

Fig. 4 is a section taken along line 4—4 of Fig. 3.

As shown in Fig. 1, the windshield cleaner may include a motor 11, secured upon the header structure 12 above windshield glass 13 of the vehicle, the motor having a forwardly extending shaft 14 to which wiper carrying arm 20 is secured by the arm mounting means. The free end of the arm carries and presses against the windshield glass a wiper blade 20'.

As shown in Fig. 3, the shaft 14 is deformed to provide a hump 15, the rear portion of which constitutes a shoulder, and a terminal portion 16 extending normal to the axis of the shaft proper, i. e. radially of the shaft proper and on the opposite diametrical side of the shaft from the shoulder. A casing member 17 extends about the terminal portion 16 of the shaft, having a front wall 18, in a plane forward of the terminal portion, with rearwardly extending flanges or side walls 19 situated on opposite sides of the terminal portion. The upper wall 21 of the casing 17 has a depending lip 22 seating upon the shaft 14 behind shoulder 15. At a level beneath the hollow 23 formed by the hump in the shaft, the rearward edge of the side walls 19 have forwardly and downwardly extending bayonet slots 24 for receiving trunnions 25 which project laterally from the upper end of a stirrup 26. The latter is of slightly less width than the space between walls 19, and its lower end 27 is forwardly extended and provided with a key hole slot 28 for slidingly receiving the terminal portion 16 of the shaft.

Housed within the chamber defined by casing walls 18, 19, 19 and stirrup member 26, and carried by terminal portion 16 of the shaft, is a coiled spring 29. The latter is normally under compression, one end bearing upon part 27 of the stirrup and the other end bearing upon a collar 31 on the shaft. The effect of the spring is to retain the trunnions 25 seated in the recesses of the key hole slots 24, to retain lip 22 of the casing seated upon shaft 14 and against shoulder 15, and to urge the casing 17 and wiper arm 20 (which may be secured to the casing, as by fastener 32) toward the windshield glass, i. e. in a counter-clockwise direction relative to the shaft (as the parts appear in Fig. 3) the seat of lip 22 upon the juncture of shaft proper 14 with shoulder 15 constituting the pivot axis 33.

During normal operation of the cleaner, shaft 14 is oscillated by the motor 11, and this motion will, of course, be imparted to the casing 17 and arm 20 to move the wiper blade 20' in an arcuate path over the windshield surface. During such action the blade will be pressed firmly into wiping contact with the glass by reason of spring 19. The spring, being almost completely encased, is protected from the elements and foreign matter. Removal of the blade, for cleaning parts or replacement, may be effected upon lifting the arm 20 from the glass, about the pivot axis 33, during which action spring 19 is further compressed due to movement of stirrup part 27 along terminal portion 16 toward the axis of the shaft.

To effect removal of the arm and mounting assembly from the shaft 14, the stirrup 26 and casing 19 are raised, and the casing angularly deflected, to the positions indicated by broken lines in Fig. 3, and the casing then moved forwardly and upwardly, as in the direction indicated by the arrows in Fig. 3 to free it from connection with the shaft and stirrup, the trunnions 25 being passed by the necks of the bayonet type slots 24. The stirrup may then be removed from the terminal portion 16 of the shaft by snapping the walls of keyhole slot 28 thereover, the metal defining the mouth of the slot being temporarily spread by flexure during such action. Attachment of the stirrup and casing to the shaft may be effected by reversing the aforementioned steps.

It will be understood that the terms "upper", "lower" and the like, appearing in the specification or claims are merely to facilitate description of the device, and that the parts may readily be inverted or disposed at any desired inclination, as for example, when the wiper shaft 14 is at the bottom or at a side edge of the windshield, rather than at the top edge as shown.

It will be understood further that the device illustrated and described is merely illustrative of the inventive principles involved, which may be embodied in other physical forms without departing from the scope or spirit of the invention.

What is claimed is:

1. In a windshield cleaner, a wiper shaft having a terminal portion extending substantially normal to the axis of the shaft proper, said shaft having a deformation providing a seat on the shaft adjacent said terminal portion and on the side of the shaft diametrically opposite to said terminal portion, a casing member housing the end of the shaft including said terminal portion and having a part engaged with said seat for pivotal movement relative thereto, a stirrup member having one end slidably engaged with said terminal portion for movement toward or away from the shaft proper and having its other end pivotally engaged with the casing member, a wiper arm carried by one of said members, and a coiled spring mounted upon said terminal portion and engaging said one end of the stirrup member for urging the latter away from the shaft proper.

2. In a windshield cleaner, a wiper shaft having a shoulder thereon and a terminal portion extending substantially normal to the shaft proper and on the opposite diametrical side of the shaft proper from said shoulder, a housing member disposed over said terminal portion and seating upon the shaft behind said shoulder, a stirrup member slidably mounted upon said terminal portion and engaged with said casing, a compression spring upon said terminal portion and pressing against said stirrup member for urging the latter away from the shaft proper, and a wiper arm connected to one of said members.

3. In a windshield cleaner, a wiper shaft having an angularly extending part, a casing member pivoted to the wiper shaft, a stirrup member within the casing member and having a part mounted upon and guided by the shaft part for movement in a path angularly with respect to the axis of the shaft proper, said stirrup member having a portion pivotally engaged with said casing, spring means within said casing member and acting between the shaft and stirrup member for urging movement of the latter along said path, and a wiper arm carried by one of said members.

4. In a windshield cleaner, a wiper shaft having a terminal portion extending radially from the shaft proper, a casing member of elongate form pivoted upon the shaft proper and extending over the terminal portion, said casing comprising a front wall in front of said terminal portion and flanges extending rearwardly from the front wall, a coiled spring upon said terminal portion, a stirrup member substantially parallelling said front wall and cooperating with the casing member to encase the spring, said stirrup having its lower end formed to embrace and slide upon said terminal portion and engage the lower end of said spring and its upper end pivoted to the flanges of the casing member, and a wiper arm carried by one of said members.

5. In a windshield cleaner, a wiper shaft having a terminal portion extending radially from the shaft proper, a member pivoted to the shaft and having side walls extending along said terminal portion, a coiled spring upon the terminal portion, a stirrup member having one end slidably engaging the terminal portion and said spring and having trunnions formed on the other end thereof, said side walls having recesses formed therein receiving said trunnions, and a wiper arm carried by one of said members.

6. In a windshield cleaner wiper arm mounting, a shaft having a shouldered portion and a terminal portion extending therefrom and radially of the shaft on the side thereof diametrically opposed to said shoulder, a casing of elongate form extending about said shoulder and terminal portions and having a part bearing upon the shaft behind the shoulder, said casing having walls lying on opposite sides of the terminal portion, the rear edges of said walls having bayonet slots formed therein, a stirrup disposed behind said terminal portion and between said walls, said stirrup having trunnions received in said slots and having a forwardly directed portion embracing and slidable upon said terminal portion, and a coiled spring upon the terminal portion and compressed between the shaft proper and said forwardly directed portion of the stirrup.

ERWIN C. HORTON.